Feb. 9, 1954 F. P. GOHOREL 2,668,876

DOUBLE-SELECTION ELECTRONIC SWITCHING SYSTEM

Filed Oct. 14, 1950 3 Sheets-Sheet 1

Inventor
FERNAND P. GOHOREL

By Robert Harding Jr.
Attorney

Feb. 9, 1954 F. P. GOHOREL 2,668,876

DOUBLE-SELECTION ELECTRONIC SWITCHING SYSTEM

Filed Oct. 14, 1950 3 Sheets-Sheet 2

Inventor
FERNAND P. GOHOREL
By Robert Harding Jr.
Attorney

Feb. 9, 1954 F. P. GOHOREL 2,668,876

DOUBLE-SELECTION ELECTRONIC SWITCHING SYSTEM

Filed Oct. 14, 1950 3 Sheets-Sheet 3

Inventor
FERNAND P. GOHOREL

By Robert Harding Jr.
Attorney

Patented Feb. 9, 1954 2,668,876

UNITED STATES PATENT OFFICE 2,668,876

DOUBLE-SELECTION ELECTRONIC SWITCHING SYSTEM

Fernand P. Gohorel, Antony, France, assignor to International Standard Electric Corporation, New York, N. Y., a corporation of Delaware Application October 14, 1950, Serial No. 190,119

7 Claims. (Cl. 179—18)

The present invention relates to selection systems for electrical circuits or equipments, and more particularly to systems making it possible to obtain high selection capacities by the "double selection" method. In these systems a "primary selector" hunts for a free "secondary" selector giving access to at least one free circuit in the desired group (primary hunting), the secondary selector then selecting a free circuit in the said group (secondary hunting).

Under these conditions it may happen that two different calls successively make use of two primary selectors, then of two secondary selectors giving access to the same outlets. If the number of the desired group is the same for both calls, and if only one circuit is free in said group, one of the calls will be delayed or lost. In order to overcome this drawback, a certain number of arrangements have been provided in the patent application, Serial No. 188,932, filed October 7, 1950.

However, said arrangements lead to certain restrictions in the arrangement of the selectors; each set of secondary selectors of which the setting is controlled by the same common control circuit has to have individual outlets; moreover, all the secondary selectors of the same assembly other than the chosen selector cannot be selected between the end of the primary hunting and the end of the secondary hunting.

These restrictions are often a drawback in the arrangement of the selectors and lead to a slowing down of selection. It is the object of the present invention to eliminate these restrictions.

One of the characteristics of the invention consists of a double-selection system in which the primary selection is only made effective when the secondary selection is completed.

Another characteristic of the invention consists of a double-selection system comprising the use of an assembly of primary selectors associated with a common control circuit, means being provided in said common control circuit to prepare the primary selection operations as soon as the desired number has been received, the connection through the primary selector being delayed until the outgoing line of the secondary selector has been selected.

Another characteristic of the invention consists in extending the control wires terminating in the primary common control circuit as far as the secondary selector, as soon as the primary selection has been prepared in said common control circuit, and this is done by means belonging to said common control circuit and independent of the primary selector employed.

Another characteristic of the invention consists in the fact of employing all or part of the contacts carried by the selection members (control magnets, selector-relays, for example) belonging to the primary common control circuit, in order to extend the control wires terminating in the primary common control circuit as far as the secondary selected selector.

A certain number of special cases are liable to arise while the call is being handled. It may happen that the same secondary selector is selected by two different primary common control circuits (double test); the secondary common control circuit may find no free line in the group dialled if said group is fully engaged between the end of the primary hunting and the end of the secondary hunting, or rather the same line may have been selected for two different secondary common control circuits. In all these cases arrangements must be provided so that no call is lost.

Another characteristic of the invention consists in a double selection system comprising a retardation device, placed in the register, which can be put into use immediately after the selection of a secondary selector, and until the selection of an outgoing line of the secondary selector, and which operates after a certain lapse of time if the following operations are delayed, means made dependent upon this retardation device then being provided in order to restore the register to the position it held before the primary hunting, said hunting then being resumed.

Another characteristic of the invention consists of a double selection system comprising a retardation device, placed in the primary common control circuit, which is put into use after the selection of a secondary selector and which operates after a certain lapse of time if the following operations are delayed, means placed under the control of said retardation device then being provided in order to isolate the control wires of the chosen secondary selector, and in order to restore the primary control circuit to the position it occupied before the primary hunting, said hunting then being resumed.

In switching systems such as the one under consideration, the same common control circuit may be simultaneously connected to several different selectors, and consequently to the registers connected to said selectors. Moreover, the primary and secondary common control circuits remain connected to the corresponding selectors until the end of the secondary hunting, the operations relating to the connection of the line wires and to the release of the common control circuits being delayed until this moment. In this case, two or more registers may be in parallel on the same primary common control circuit, or on the same secondary common control circuit or on both common control circuits at the same time; it is therefore important to make all useful arrangements to prevent cross-connections and consequently false selections.

Another characteristic of the invention consists in the fact that the selection signals which are transmitted over a common control circuit to a register are sent in different time units, according to whether it is a question of primary or secondary hunting, and moreover, whether means are provided in the register so that the latter only controls the selection signals of the hunting (i. e. either primary or secondary) which it is to control at a given moment.

Another characteristic of the invention consists in the fact that the selection signals transmitted over a common control circuit to a register are odd impulses during the primary hunting and even impulses during the secondary hunting or vice-versa.

When the primary and secondary selections have been prepared by the corresponding common control circuits, the connecting operations through the selectors then proceed.

Another characteristic of the invention consists in the fact that when the primary and secondary selections have been prepared by the corresponding common control circuits, a signal for the preparation of connection is transmitted from the register to the secondary common control circuit, an "acknowledge reception" signal then being sent step-by-step from the secondary common control circuit to the register, means then being provided to transmit step-by-step, from the register to the secondary selector, a connection-control signal causing the establishment of the continuity of the line wires and the release of the common control circuits.

In the patent application of Martinus den Hertog et al., filed on June 14, 1950, Serial No. 168 072, for "Selection System for Electrical Circuits or Equipments," mention was made of cross-bar switches or multi-switches composed of a certain number of individual connectors; the operation of each individual connector is prepared by a clutch magnet peculiar to said connector and caused by a servo-magnet common to all the individual connectors of the multi-switch.

Another characteristic of the invention consists, in combination with the foregoing, of the fact of employing the connection-preparation signal to cause the operation of the clutch magnets peculiar to the two individual switches employed as primary and secondary selectors, the connection-control signal being employed to cause the operation of the servo-magnets associated with the corresponding multi-switches.

Various other characteristics will appear from the following description given as a non-limitative example and referring to the attached drawings in which.

In the following descriptions the contacts associated with a particular relay have been given the same letter or the same group of letters as the relay, (but in small letters) followed by one of the digits 1 to 9. The contacts associated with a particular magnet have been given the same reference as said magnet, but followed by one of the digits 1 to 9.

The switches used as finders or selectors are cross-bar switches of the type mentioned in the patent application Serial No. 168,072, above referred to. In the following, the contacts actuated by the horizontal bars of said switches have been given the reference HB followed by one of the digits 1 to 9.

First of all, the operations relating to primary hunting will be explained. The primary selector *Se1* (Fig. 2) has been selected by the preceding selector *Se* (Fig. 1) by any suitable means, the said selector *Se* being moreover connected to the register *En* through a finder *Ch*. The following circuit is then completed: earth in the register *En* (Fig. 1), resistance *r1*, lower wire of the line *b* through the finder *Ch* and the selector *Se*, back contact HB1 associated with the horizontal bar of selector *Se1* (Fig. 2), right-hand winding of clutch magnet H peculiar to said selector *Se1*, in the common control circuit *Or1*, relay A battery. On account of the value of the resistance *r1* and of the values of the resistances of the right-hand winding of magnet H and of relay A, said relay A alone is attracted in the previous circuit. By its make contact *a1*, the relay A causes the energisation of relay B through the back contacts *m1* and *k1*.

Relay B causes the energisation of relay C by its make contact *b2* and prepares at *b3* and *b1* the respective operations of the scanning device *Ex* and the indicator *In*. The scanning device *Ex* is substantially composed of a set of rectifiers to which are applied sources of impulses situated in time *Pa1*, *Pa3*—*Pb1* to *Pb5*—*Pc1* to *Pc5* and by an amplifier system J shown schematically by a square in dotted lines. Its operation has been described in the two patent applications above referred to. Impulses situated in time are periodically sent by the scanning device *Ex* to the wire *d* in each of the time units characterising a free secondary selectors *Se'1*, giving access to at least one free line in the group scanned.

Figure 3:
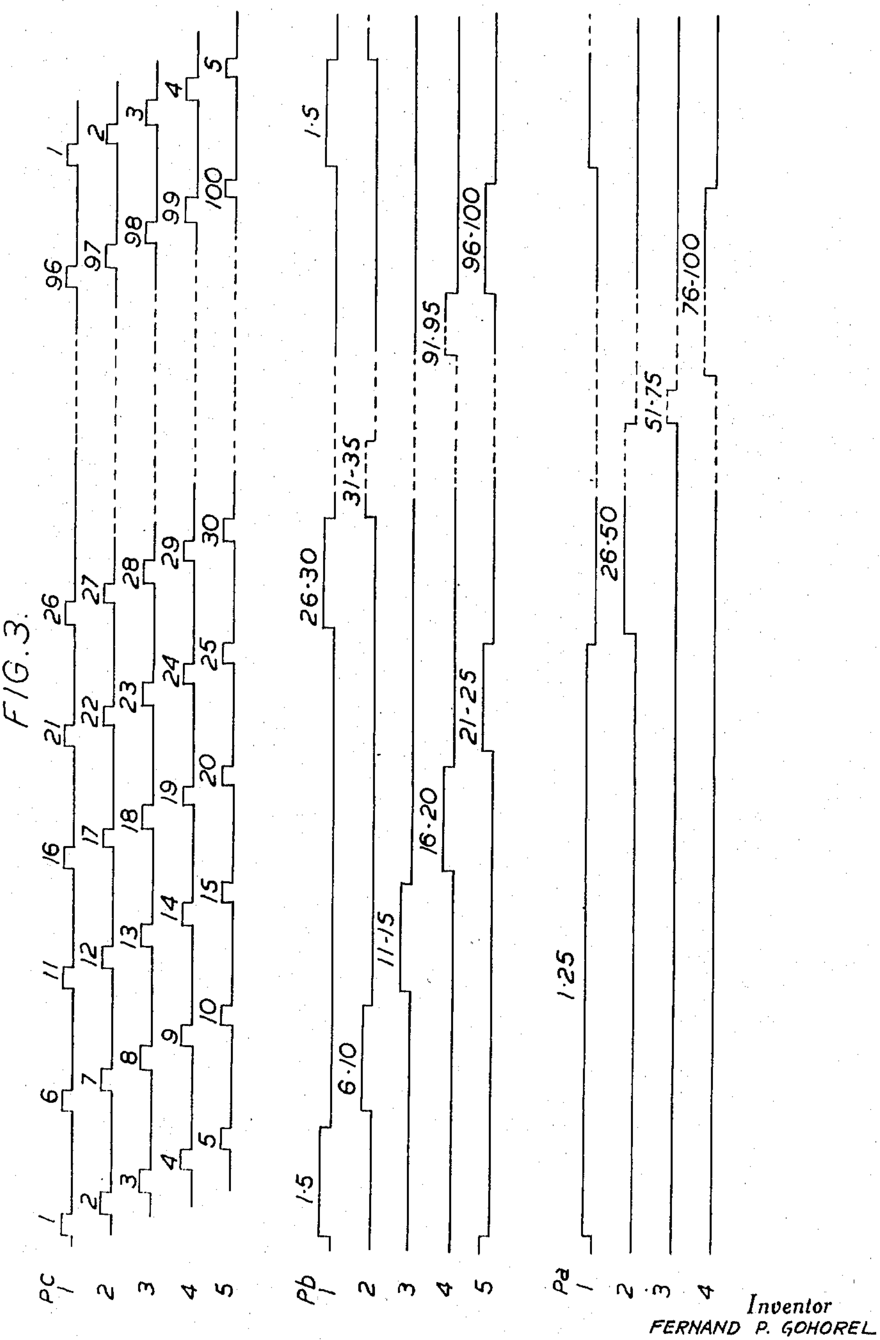
Fig. 3 shows a diagram of the cycles of impulses situated in time employed to control the selection.

These impulses are only sent during the time of transmission of the impulses *Pa1* and *Pa3*, because at any other time current is free to flow through the rectifiers to the sources of *Pa1* and *Pa3* which are then at a lower potential and the voltage on the wire *d* will then drop. This may be seen from the arrangement of rectifiers associated with the primary common control circuit In the example under consideration, it has been assumed that the scanning device *Ex* was associated with two sources of impulses situated in time *Pa* (*Pa1* and *Pa3*), 5 sources of impulses *Pb* (*Pb1* to *Pb5*) and 5 sources of impulses *Pc* (*Pc1* to *Pc5*). Thus in all there are $2\times5\times5=50$ time units, the primary selector *Se1* thus having access to 50 lines. The diagrams of the cycles of impulses given by these impulses are shown in Fig. 3, and are similar to those described in the two patent applications previously mentioned.

Each scanned point or terminal of the scanning device *Ex* corresponds to a secondary selector. If the secondary selector connected to a terminal of the scanning device is free, earth potential is applied thereto from earth via $r'4$ in the secondary selector, contact HB'5 which is closed if that selector is free, wire $\delta$, and a further resistance to the scanner. However, the scanner is required to pass impulses representing not only free secondary selectors but groups having free outlets accessible via such selectors. For this purpose there is a circuit in the common control circuit which applies pulses to another test lead for each secondary selector which represents groups accessible via that secondary selector. This circuit will now be described separately.

Connected to each outlet of a secondary selector is one pulse source of the group of sources $P_N$. These pulse sources deliver pulses which each have a pulse length equal to a full cycle of the Pa, Pb, Pc sources, i. e. each pulse is 100 time units long and the "no-pulse" period is 900 time units. These sources, of which it is assumed that there are ten, give a full time cycle of 1000 time units. Hence the pulse produced for a free outlet represents both that outlet's identity and the group to which it belongs. This method of controlling group selection is described in U. S. Patent Applications, Serial No. 169,273, filed June 20, 1950, and Serial No. 168,072, filed June 14, 1950.

Each outlet from the secondary selector also has a connection to earth via HB''5 and resistance $r''4$, which applies earth to a test lead for every free outlet. All test leads belonging to any one group are commoned to a wire $\alpha$ for each outlet group. To each wire $\alpha$ there is connected one pulse source of the pulse sources $P_N$. All intermediate test leads $\alpha$ are commoned to the control grid of a tube TV. This tube has its control grid also connected to a bleeder circuit X'—X' which normally holds it cut off. For every free outlet in a particular group a pulse is applied to tube TV which causes TV to conduct for the time duration of the corresponding $P_N$ source, thus identifying the grouping to which that outlet belongs. It will be noted that in each stage of commoning in this test circuit there is a decoupling rectifier.

The cathode output pulses of TV are applied via leads $a$ to the input leads for that secondary selector on the scanners Ex for primary selectors which have access to that secondary selector. The result of this test circuit is that the "free outlet" conditions present on the terminals of the scanner Ex represent both the free or busy condition of an outlet, i. e. whether or not that secondary selector is free, and whether or not that secondary selector has access to a free line in a particular group. Hence, in the present case, a full cycle of 1000 time units will convey to the scanner *Ex*, and therethrough to the register-controller, information relating to all secondary selectors accessible via the seized primary selector which are free, and also all groups in which each secondary selector has access to at least one free outlet. Thus, the test circuit can be said, in effect, to "see through" the secondary selectors to the outlets to which the full double selection stage has access.

The impulses transmitted by the scanning device Ex are transmitted to the register through the following circuit: back contact $k^4$, back contact H2, back contact $HB_3$ associated with the horizontal bar of selector Se1, wire *d* through selector Se (Fig. 1), and finder Ch, back contact ok1, and comparator Co. Said comparator, moreover, receives impulses $P_N$ in time units corresponding to the called number which has been dialled, and also impulses Pa1 and Pa3, through the back contact eo2.

When there is coincidence between an impulse coming from the common control circuit Or1 and the comparison impulses $P_N$, Pa1, Pa3, i. e. when the impulses received from the common control circuit correspond to the group dialled, the comparator operates to send current through the middle winding in accordance with the method described in the patent application Serial No. 168,072, referred to above.

An impulse is produced in the middle winding of transformer TR when coincidence occurs in the pulses applied to the inputs (PN, wire *d*, and over eo2) of the comparator, and transmitted by induction in the two other windings. This impulse is produced in a time unit which has a particular relation with the impulse received from the common control circuit; it therefore, like the latter, characterises the secondary selector which has to be selected, as has been explained in the above mentioned patent application. The impulse transmitted in the right-hand winding is applied to the control electrode of the cold cathode tube T1 through resistance r6, which causes said tube to operate through the following circuit; earth, make contact bo1, associated with relay Bo (normally energised through a circuit indicated by dotted lines), back contact ok3, back contact d2, relay Si, which pulls up, anode and cathode of tube T1 and —150 v. The impulse transmitted in the left hand winding of transformer TR is sent to the common control circuit Or1 of the primary selector Se1 through the following circuit: rectifier Rd1, wire c through finder Ch and selector Se, back contact HB2, associated with the horizontal bar of selector Se1 (Fig. 2), back contact k3 and indicator In of the common control circuit Or1 to the control circuits of all of the tubes contained in the indicator In.

In accordance with the method explained in the patent application Serial No. 168,072, referred to above, the impulse received by the indicator In causes the firing of a combination of tubes (not shown) corresponding to the impulse detected in the comparator. These tubes cause the energisation of a combination of relays such as "O" which are respectively associated with them, these relays in turn, through a combination of contacts such as o1, causing the operation of vertical magnet V controlling the vertical bar belonging to the selected line. In order to simplify the drawing only a single relay O and a single vertical magnet V have been shown. The magnet V, which has operated, then completes the following holding circuit for itself: battery, magnet V, make contact V1, contact o2, closed when a combination of relays such as O have operated, relay M which is energised, and earth.

In accordance with the method described in the above mentioned patent application, the indicator In causes the blocking of the scanning device and no other impulse is then returned to the register.

In the register, relay Si (Fig. 1) completes the following circuit through its make contact si1: earth, make contact si1, back contact eo1, relay Do, battery. Relay Do pulls up and by the opening of its back contact d2 extinguishes tube TI and causes the release of relay Si. After the opening of contact si1, relay Do is held and relay Eo energised through the circuit; battery, relay Do and Eo in series, make contact d1, back contact ok4, make contact bo2, earth. Relay Eo prepares the various operations relating to the secondary selection.

In the primary common control circuit Or1 (Fig. 2), the relay M, through its back contact m1, opens the circuit of relay B, which falls back. Relay C has its circuit opened at b2; but, being retarded on account of the short circuiting of its right-hand winding, it is not released in the time unit concerned. Moreover, magnet V causes the closing of the associated contacts V2—V6; through its contact V2, it completes the following circuit: battery, windings in series of the relay G, make contact c1, make contact V2 belonging to the selected line, wire f', back contact HB'5 associated with the horizontal bar of secondary selector Se'1, and closed if said selector is free, resistance r'4, earth. If the secondary selector Se'1 has only been selected by the selector Se1 concerned, relay G is maintained attracted on the above mentioned circuit and by its make contact g1 causes the energisation of relay K in parallel on said circuit.

Owing to the opening of contact b1, the indicator In returns to normal and the actuated relays O are released.

The operations relating to secondary selection will now be described. Relay K, through its make contact k2, completes a holding circuit for vertical magnet V and relay M; through its make contact k5, it causes the seizure of secondary selector Se'1 and that of the associated common control circuit Or'1, the following circuit being completed: earth, make contact k5, resistance r5, make contact V5, back contact HB'1 associated with the horizontal bar of selector Se'1 right hand winding of clutch magnet H' belonging to said selector, relay A' battery. Owing to the value of resistance r5, relay A' alone is energised in the preceding circuit. Through its make contact a'1, relay A' causes the energisation of relay B' through the following circuit: earth, make contact a'1, back contact m'1, back contact k'1, relay B' and battery. Through its make contacts k3 and k4, relay K causes the connection of the incoming wires c and d in selector Se1 to the incoming wires c' and d' entering the selector Se'. These connections are respectively effected through the two following circuits: incoming wire c in selector Se1, back contact HB2, make contact k3, make contact V3, and incoming wire c' in selector Se'1; incoming wire d in selector Se1, back contact HB3, back contact H2, make contact k4, back contact e3, make contact V4 and incoming wire d' in secondary selector Se'1.

Owing to the closing of contact b'2, and in accordance with the method described in the patent application, Serial No. 168,072, referred to above, the scanning device Ex' periodically sends to register En impulses situated in time each corresponding to one free outlet in selector Se'1. These impulses are sent through the following circuit: back contact H'2, back contact HB'3, associated with the horizontal bar of selector Se'1, make contact V4, back contact e3, make contact k4, back contacts H2 and HB3, wire d through the selector Se and finder Ch, back contact ok1 and comparator Co.

Two sources of impulses Pa (Pa2 and Pa4), 5 sources of impulses Pb (Pb1 to Pb5), and 5 sources Pc (Pc1 to Pc5) have been provided in the scanning device Ex'. Thus there are a total of 2×5×5=50 time units, 50 outgoing lines thus being capable of being connected on the banks of selector Se'1. The impulses are only emitted by the scanning device Ex' during the periods of emission of the sources Pa2 and Pa4.

In the register En (Fig. 1), the comparator Co still periodically receives impulses $P_N$ in time units corresponding to the number dialled; but, owing to the make position of contact eo2, it now receives impulses Pa2 and Pa4, the sources Pa1 and Pa3 being isolated. If another register such as En and another primary selector such as Se1 seize the common control circuit Or1 during the operations relating to the secondary selection, said register cannot operate and has to wait for the end of the secondary selection.

When the impulse coming from the common control circuit Or'1 coincides with the impulses transmitted by the local sources $P_N$, Pa2 and Pa4, that is to say, when the comparator receives an impulse characterising a free outgoing line of the secondary selector Se'1 and corresponding to the number dialled, the comparator Co operates by sending current through the middle winding in accordance with the process described in the above-mentioned patent application. Impulses are sent through the transformer TR, one on the control electrode of cold cathode tube TI and the other on the wire c through rectifier Rd1.

Tube T1 is fired through the following circuit: earth, make contact bo1, back contact ok3, make contact eo4, relay Si, which is energised, anode and cathode of tube TI and —150 v.

The impulse produced in the left hand winding of transformer TR is sent to the secondary common control circuit Or'1 through the following circuit: rectifier Rd1, wire c through finder Ch and selector Se, back contact HB2, make contacts k3 and v3, back contact HB'2 associated with the horizontal bar of selector Se'1 and indicator In' of common control circuit Or'1. In accordance with a method described in the patent application Serial No. 168,072 filed on June 14, 1950, which has been mentioned several times, a certain number of cold cathode tubes integral with the indicator In' (not shown) are fired, thus causing the operation of a combination of a certain number of relays such as O', only one of which has been shown. The combination of tubes and also that of the relays O', which have operated, characterises the selected line. By a combination of make contacts such as o'1, the relays O', which are pulled up, cause the energisation of a vertical magnet V' belonging to the chosen line. Only one magnet such as V' has been shown, in order to simplify the drawing. Magnet V' completes the following holding circuit for itself; battery, magnet V', make contact V'1, make contact o'2, closed when a combination of relays O' has operated, relay M', earth.

Indicator In' also causes, in accordance with the process indicated, the blocking of scanning device Ex', which no longer sends impulses to the register En.

In the register, En (Fig. 1) relay Fo is energised through the following circuit: battery, relay Fo, make contact eo1, make contact si1, earth. Through its make contact fo2, relay Fo completes the following circuit: battery, windings in series of relay T, make contact fo2, back contact pr2, wire a, through the finder Ch and selector Se, back contact HB4 associated with the horizontal bar of selector Se1, make contact V6, back contact HB'4, associated with the horizontal bar of selector Se'1, relay K', make contact V'2 belonging to the selected line, back contact HB''5, closed if said line is free, resistance $r''4$ and earth. If the outgoing line of selector Se'1 has only been selected by said selector, relay T is energised and held in the preceding circuit. Relay K' also operates when the lower high resistance winding of relay T is shunted by relay Dt (which is energised) and make contact t1. Through its make contact k'2 (Fig. 2) relay K' completes the following holding circuit for vertical magnet V': battery, magnet V', make contact V'1, make contact k'2, relay M' and earth; through its back contact k'1, it opens the circuit of felay B' which is released. Relays O', having their circuit opened at B' are released.

In the register *En* (Fig. 1), relay *Dt* completes the following circuit through its make contact *dt*3: battery, relay O*k*, make contacts *do*3, *fo*3 and back contact *pr*3 in parallel; make contact *dt*3 and earth; through its make contact *dt*1, it completes a holding circuit for itself and for the relay T.

Figures 1, 4:
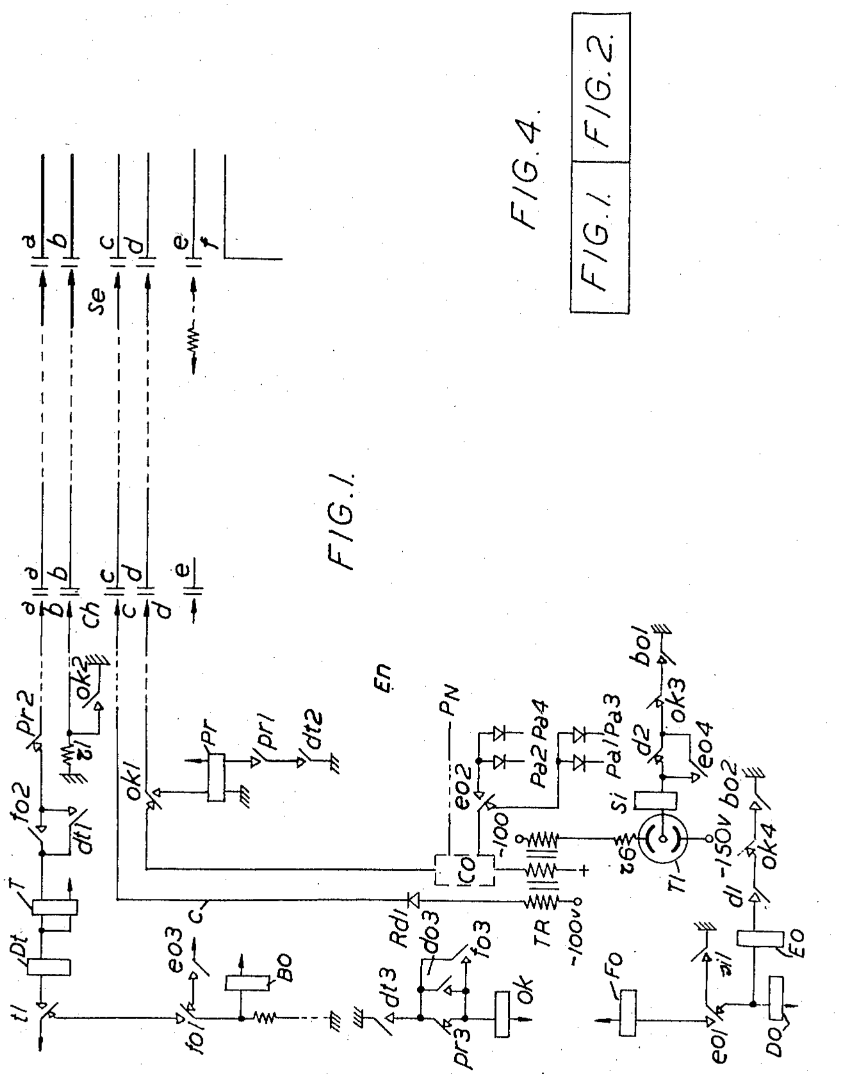
Fig. 1 shows the circuit elements of a register necessary for an understanding of the invention.
Fig. 4 shows the method of connection of Figs. 1 and 2.
Figure 2:
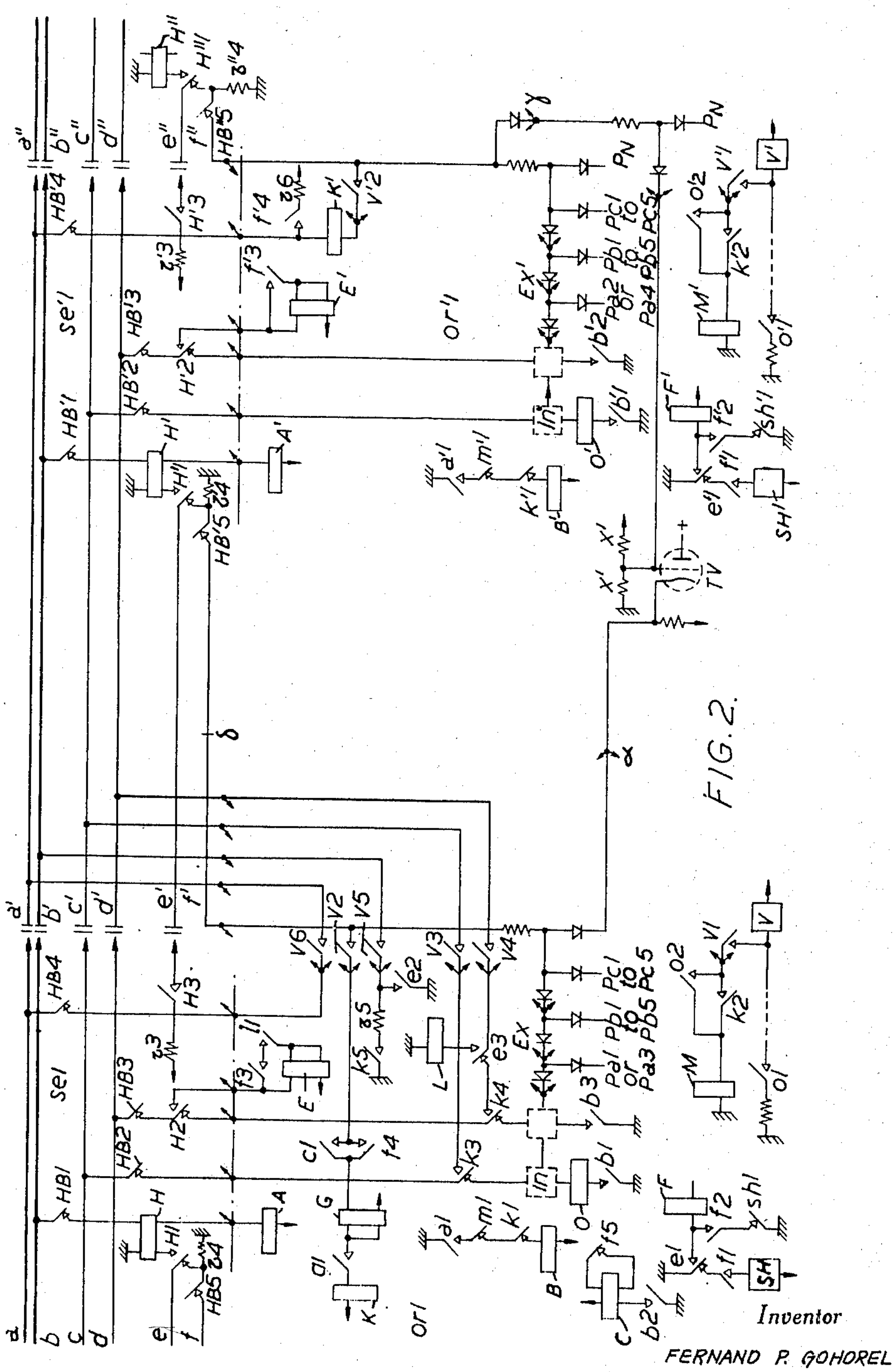
Fig. 2 shows a primary selector, a secondary selector and the common control circuits respectively associated therewith.

The busy condition is marked on the outgoing line owing to the application of a battery to the back contact HB''5 (Fig. 2) through the low resistance of the relays T, D*t* and K' in series (Fig. 1).

The primary and secondary selections have been prepared by the common control circuits Or1 and Or'1, in this sense, that vertical magnets V and V' belonging to the selected lines have operated; they are not yet effective, however, since the selectors Se1 and Se'1 themselves are not yet connected to the said selected lines.

We will now explain how the connection of primary selector Se1 to the chosen secondary selector Se'1 is effected, and how the connection of secondary selector Se'1 is effected to the desired line. Through its make contact *ok*2 the relay O*k* short-circuits the resistance *r*1, thus causing the energisation of magnet H belonging to selector Se1; through its contact *ok*3 it causes the release of relay S*i* and the tube TI to be extinguished; through its contact *ok*4, it causes the release of relays Eo and Do. Relay Fo is released, having its circuit opened at *eo* and *si*1. Through its make contact H1, the magnet H completes the following holding circuit for itself: earth, left hand winding of magnet H, make contact H1, wire *e* and battery through the selector Se; through its make contact H2, it completes the following circuit: battery, windings in series of relay E, make contact H2, back contact HB3, wire *d* through selector Se and finder C*h*, make contact *ok*1, left hand winding of relay P*r*, earth. Owing to the values of the resistances of the left hand winding of relay Pr and of the two windings of relay E, said relay E alone pulls up in the circuit previously mentioned and causes the operation of relay F through its make contact *e*1; through its make contact *e*2, relay E short-circuits the resistance *r*5, thus causing the operation of the magnet H' belonging to selector Se'1. Relay F is held by *f*2 and *sh*1 and prepares at *f*1 the circuit of servomagnet SH; at *f*4 it completes a holding circuit for relays K and G; at *f*5 it removes the short-circuit from the right-hand winding of relay C, which is released rapidly, but without any other effect.

In the secondary selector the magnet H' prepares a holding circuit for itself through its make contact H'1; through its make contact H'2, the magnet H' completes the following circuit: battery, windings in the series of relay E', make contact H'2, back contact HB'3, make contact V4, make contact *e*3, relay L and earth. Owing to the value of the resistances of the relays L and E', the relay E' alone is energised in the circuit previously described and causes the operation of relay F' through its make contact *e'*1. Relay F' is held by *f'*2 and *sh'*1 and prepares at *f'*1 the operation of servo-magnet SH'.

Through its make contact *f'*3, relay F' short-circuits the upper winding of relay E', thus causing the energisation of relay L. Said relay L, through its make contact *l*1, and through make contact *f*3, causes the short-circuiting of the upper high-resistance winding of relay E, which causes the operation of relay Pr in the register E*n*.

Relay Pr is held by *pr*1 and *dt*2, and, through its back contact *pr*2, opens the circuit of wire *a*, thus causing the release of relays T and D*t*; through its back contact *pr*3, it causes the release of relay O*k*, assuming that the relays S*i*, Eo and Do have been released within a predetermined interval of time. Relay K' (Fig. 2) is held through: battery, resistance *r*6, make contact *f'*4, relay K', make contact V'2, back contact HB''5, resistance $r''4$ and earth; the battery applied through resistance *r*6 to contact HB''5 maintains the busy marking on the outgoing line. Through its make contact *ok*1 (Fig. 1), relay O*k* causes the release of relay E in the primary common control circuit O*r*1. Relay Pr is released, its two windings being respectively opened at *dt*2 and *ok*1.

In the primary common control circuit O*r*1, the relay E, through its back contact *e*1, completes the following circuit: battery, servo-magnet SH, make contact *f*1, back contact *e*1 and earth. Magnet SH controls the displacement of the horizontal bar of selector Se1, which had been prepared by the operation of magnet H.

By opening its make contact *e*3, relay E opens the circuit of relay E' of common control circuit O*r'*1, said relay E' then completing the following circuit through its back contact *e'*1: battery, servo-magnet SH', make contact *f'*1, back contact *e'*1 and earth. Relay L, having its circuit opened at *e*3, releases, but without any other result. Magnet SH' then controls the displacement of the horizontal bar of secondary selector Se'1, which had been prepared by the operation of magnet H'. When the bars of the primary and secondary selectors have been displaced, the connection is completed from the input wires *a, b, c, d* of the primary selector as far as the output wires *a'', b'', c'', d''* of the secondary selector. The common control circuits are isolated from the corresponding selectors by the contacts HB1 to HB4 and HB'1 to HB'4 respectively associated with the horizontal bars of the primary and secondary selectors. Said common control circuits are released in accordance with a known method and are ready to handle another call. Magnet H', of selector Se'1 is held attracted through earth, left hand winding of H', make contact H'1, wire *e'* and battery in selector Se1 through contact H3 and resistance *r*3.

We will now consider the various special cases which may arise during the handling of a call, and it will first of all be assumed that the same secondary selector Se'1 has been selected by two primary common control circuits such as O*r*1. In this case, at least one of the relays G of the two common control circuits *or*1 cannot be maintained held and the corresponding relays K remain idle. The relays O, having their circuits opened at *b*1, in turn cause the opening of contact *o*2 thus causing the release of relay M, which cannot be maintained since contact *k*2 is open.

Relay M, through its back contact *m1*, re-establishes the circuit of relay B and the scanning device E*x* can again operate owing to the closing of make contact *b3*. In the register E*n* (Fig. 1) relay Bo is short-circuited as soon as the primary hunting ends, through the make contact *eo3* and back contact *fo1*; after a certain lapse of time, it falls back, and, by the opening of its make contact *bo2*, causes the release of relays Do and Eo. The relay Bo, having its short-circuit removed at *eo3*, is re-energised through an obvious circuit. The register is then in a position to control the primary hunting afresh, the sources of impulses situated in time, P*a1* and P*a3*, being again connected to the comparator Co and the sources of impulses P*a2* and P*a4* being isolated owing to the position of contact *eo2*.

It will now be assumed that the outgoing line of selector Se'1 has been selected by two common control circuits such as O*r*'1. Under these conditions two registers such as E*n* are in parallel on the same outgoing line; 2 sets of relays such as T, D*t* and *K'* are in parallel on the same resistance *r''4*. At least one of the relays T cannot be held attracted, and the corresponding relays D*t* and *K'* do not operate. Magnet V' in at least one of the secondary common control circuits O*r*'1 cannot be held owing to the opening of contact *k'2*; the corresponding relay M' is released, and through its back contact *m'1* re-closes the circuit of relay B'. The scanning device E*x'* can operate again owing to the closing of contact *b'2*. In the register, Bo is short-circuited as soon as the secondary hunting ends through the back contact *t1* and make contact *fo1*. After a certain lapse of time it falls back and causes at *bo2* the release of relays Eo and Do. Relay Eo causes at *eo1* the release of relay Fo and at *eo4* the release of relay S*i* and the tube T1 to be extinguished. In the primary common control circuit O*r*1, relay C has its circuit opened at *b2* as soon as the primary hunting ends; after a certain time, it is released, opening at *c1* the circuit of the two relays K and G. Magnet V and relay M are released in their turn, their circuit being opened at *k2*. Relay B is re-energised through the circuit already described and causes at *b2* the re-energisation of relay C. Hunting can begin afresh, all the relays having returned to the position which they occupied before said hunting.

We will now consider the case in which group of outgoing lines of the secondary selector corresponding to the number dialled is fully engaged between the primary hunting and the secondary hunting. The primary hunting and the connection to a secondary selector having been effected as before, scanning by the secondary common control circuit proceeds without result, since in the interval the free lines in the secondary group have been seized by other selectors. In the primary common control circuit O*r*1, relay C, having its circuit open at *b2* from the end of the primary hunting is released after a certain time. In the register E*n* (Fig. 1), the relay Bo, short-circuited by *eo3* and *fo1* when the primary hunting has ended, is released after a certain time and causes at *bo2* the release of relays Do and Eo. Relay Bo, having its short-circuit removed at *eo3*, is then re-energised through its original circuit. The register and the common control circuit are then again in the respective positions which they occupied before the primary hunting, said hunting can then be started afresh.

It will now be assumed that, during the secondary hunting, a primary selector Se1 and a register E*n*, other than the selector and the register concerned, seize the common control circuit O*r*1. The two registers, being in parallel on the same selection chain, will at the same time receive the impulses coming from the secondary common control circuit; as, however, said impulses are sent during the periods of emission on the sources P*a2* and P*a4*, the register concerned alone will be sensitive to these impulses, the second register not being affected. False selection is therefore made quite impossible.

It is obvious that the foregoing descriptions have only been given as a non-limitative example, and that it would be possible in particular to employ a certain number of the arrangements provided therein, in other telephone systems than the one described.

What is claimed is:

1. An automatic telephone system comprising a plurality of primary selector switches, a plurality of secondary selector switches, each of said primary selector switches having access to said secondary selector switches, means for preparing a primary selector switch for connection to a selected secondary selector switch, means controlled by said primary-selector-switch-preparing means for preparing said selected secondary selector switch for connection to a selected outlet thereof, and means controlled by said secondary-selector-switch-preparing means for making effective the prepared connection of said primary selector switch only after the connection of said secondary selector switch has been prepared.

2. An automatic telephone system, as defined in claim 1, further comprising a register, means connected to each primary selector switch for causing said primary selector switch to be seized, means for connecting said register to a seized primary selector switch, and a control circuit common to said primary selector switches and adapted to receive signals from said register, said control circuit including the means for preparing the seized primary selector switch in response to signals from said register, means controlled by said primary-selector-switch-preparing means for extending the connection between said register and the selected secondary selector switch independently of the said seized primary selector switch, and the means for making effective the prepared connection of the seized primary switch.

3. An automatic telephone system, as defined in claim 2, in which each primary selector switch comprises a plurality of selection members and contacts operated by said members, and the means for extending the connections between the register and the selected secondary switch includes said contacts.

4. An automatic telephone system, as defined in claim 3, further comprising a retardation device in the primary-selector-switch-control circuit and arranged normally to operate a predetermined time after the initiation of the operation thereof, means controlled by the operation of the primary-selector-switch-preparing means for initiating the operation of said device after the seized primary selector switch is prepared for connection to a selected secondary switch, and means under control of said retardation device time for isolating the connections to said selected secondary switch and for restoring said seized primary switch to normal.

5. An automatic telephone system, as defined in claim 4, in which means is provided in the register for transmitting signals to operate the common control circuit which are particular impulses in a cycle of time-positioned impulses.

6. An automatic telephone system, as defined in claim 1, further comprising a register capable of transmitting predetermined impulses in a cycle of time-positioned impulses, means for seizing a primary selector switch, means for connecting said register to said seized primary switch, and a control circuit common to said primary switches including means responsive to the time-positioned signals from said register, said control circuit including the means for preparing the seized primary switch in response to time-positioned signals from said register, means for extending the connection between said register and the selected secondary switch independently of the said seized primary switch, and the means for making effective the prepared connection of the seized primary switch.

7. An automatic telephone system, as defined in claim 1, further comprising a retardation device connected to each primary selector switch, and arranged normally to operate a predetermined time after the initiation of the operation thereof, means controlled by the operation of the primary-selector-switch-preparing means for initiating the operation of said device after the primary selector switch is prepared for connection to a selected secondary switch, and means under control of said retardation device for isolating the connections to said selected secondary switch and for restoring said primary switch to normal.

FERNAND P. GOHOREL.

References Cited in the file of this patent

UNITED STATES PATENTS

| Number | Name | Date |
|---|---|---|
| 1,942,462 | Wicks | Jan. 9, 1934 |
| 2,081,027 | Wicks | May 18, 1937 |
| 2,203,557 | Wicks | June 4, 1940 |